Feb. 21, 1961 H. A. MAYO, JR 2,972,469
THRUST REDUCING MEANS FOR TURBINES, PUMPS AND PUMP-TURBINES
Filed Oct. 2, 1957 3 Sheets-Sheet 1

INVENTOR.
HOWARD A. MAYO, JR.
BY
ATTORNEY

Feb. 21, 1961 H. A. MAYO, JR 2,972,469
THRUST REDUCING MEANS FOR TURBINES, PUMPS AND PUMP-TURBINES
Filed Oct. 2, 1957 3 Sheets-Sheet 2

INVENTOR.
HOWARD A. MAYO, JR.
BY
ATTORNEY

United States Patent Office 2,972,469
Patented Feb. 21, 1961

2,972,469

THRUST REDUCING MEANS FOR TURBINES, PUMPS AND PUMP-TURBINES

Howard A. Mayo, Jr., York, Pa., assignor, by mesne assignments, to Allis-Chalmers Manufacturing Company, Milwaukee, Wis., a corporation of Delaware Filed Oct. 2, 1957, Ser. No. 687,757

5 Claims. (Cl. 253—31)

This invention relates to means to reduce the total cumulative axial thrust acting in the direction of runner discharge of fixed or adjustable blade propeller type hydraulic turbines having either axial or diagonal flow blades, or to reduce the total cumulative thrust acting in an axial direction opposite to the impeller discharge of fixed or adjustable blade propeller type hydraulic pumps having either axial or diagonal flow blades.

Hydraulic turbines and pumps having propeller type runners or impellers have been used for many years to provide power and move liquids. All such turbines and pumps have a characteristically high thrust which requires the use of large and costly thrust bearings. Various thrust bearing designs and locations with respect to the turbine or pump have provided varying benefits in regard to carrying this thrust, but no design has heretofore solved the fundamental problem of high thrust resulting primarily from the hydraulic forces acting upon the blades. The problem of high thrust on this general type of hydraulic turbine or pump has been accentuated recently by the trend toward larger turbines and pumps, as well as their use under higher heads, and under these situations the thrust on turbines, pumps, and pump-turbines becomes an increasingly higher percentage of the standard generator thrust bearing capacity in hydro-electric power plants for example. This thrust bearing capacity is a major consideration tending to limit the increase in size and capacity of this type of turbine, pump, or pump-turbine, as well as limit the heads under which large units of this type may be installed.

Propeller type turbines, and particularly those of the fixed blade type, having a major advantage over mixed flow or Francis turbines in that they permit increase in the rotating speed of the generator and thus reduce the generating unit cost. This advantage is offset somewhat by the cost of providing for the higher than normal (generator standard) hydraulic thrust usually considered inherent in propeller type runners. The usual fixed or adjustable blade propeller type hydraulic turbine having axial or diagonal flow blades incorporates fixed intermediate and lower head covers rigidly bolted together and also bolted to the outer head cover. These connected covers are shaped suitably to guide the entering water from a radially inward direction and change such direction by deflection to an axial direction to engage the blades of the propeller or runner. The fixed intermediate head cover is supported by the conventional gate ring and outer head cover of a turbine assembly and contains the main bearing for the runner shaft. The inner or lower head cover contains a packing box and is rigidly bolted to the lower end of the intermediate head cover. A similar arrangement, although less common, is used in pump installations of the propeller type having a volute case, wherein the water flows axially inward and radially outward, such direction of the water thereby being reversed to that of the water moving through a turbine installation.

The hydraulic forces carried by the hydraulic turbine or pump thrust bearing are those acting upon the runner or impeller. They consist primarily of kinetic and potential energy exerted upon the blade surfaces by the water which engages the blades to drive the turbine. These cumulative forces produce a resultant force extending axially outward from the runner or impeller in both hydraulic turbines and pumps. Such resultant force is transmitted from the blades to the hub, the shaft, and to the thrust bearing. Other forces carried by the hydraulic turbine or pump thrust bearings are dependent upon the setting of the turbine or pump units in the installation thereof. Where such units are arranged substantially vertical or are inclined, the thrust bearing also must carry the weight of the rotating parts such as the runner or impeller and the blades, shafting, and generator or motor rotor weight. These weights are not carried by the thrust bearing in horizontally arranged pump settings or turbines, but are carried by horizontal guide bearings.

The fixed outer head cover usually is designed to withstand the hydraulic loads imposed upon it by pressure within the distributor assembly acting on the area of the lower face of the outer head cover, plus the resulting upward force of kinetic and potential energy within the distributor assembly acting upon the lower surfaces of the intermediate and lower head covers. Such hydraulic loads are substantial and are absorbed by the outer head cover from the intermediate and lower head covers and transmitted by the outer head cover to the stay ring and the concrete foundations which support the turbine or pump installations.

It is the principal object of the present invention to reduce the total cumulative axial thrust exerted by a turbine runner or pump impeller by providing an extension on the hub of the runner or impeller of a turbine or pump, said extension being shaped so that when it is engaged by water which is deflected thereby in moving to the turbine blades, or by water moving thereagainst from the impeller blades of a pump, a component of the water velocity thrust becomes useful to reduce the total cumulative axial thrust in the turbine or pump.

A further object of the invention is to reduce the cost of a turbine or pump assembly in that the outer head cover no longer will have to be constructed to transmit the hydraulic forces acting upon the intermediate and lower head covers to the stay ring.

Another object of the invention is to provide additional inertia in a turbine runner or pump impeller which will aid in maintaining the rotational stability of the pump or turbine by the extension of the runner or impeller hub to a larger diameter, thereby incorporating an increased rotating weight at a greater radius than is possible in conventional turbines and pumps of this type.

A still further object of the invention is to provide a centrifugal seal between the rotatable water deflecting means and the stationary head cover means which will impel water normally tending to leak into the interior of the water deflecting means and other adjacent structures to a discharge vent and conduit means.

Details of the foregoing objects and of the invention, as well as other objects thereof, are set forth in the following specification and illustrated in the accompanying drawings comprising a part thereof.

To afford a better appreciation of the characteristics and benefits of the present invention, a brief description of a conventional turbine such as is commonly used to drive an electric generator in a hydro-electric power plant, will be set forth with reference to Fig. 1. The principal components of a conventional turbine have been indicated by legend in Fig. 1 in order to minimize description. Further, it is to be understood that the present invention is applicable to propeller type pumps and pump-turbines, having either fixed or adjustable blades arranged either radially or diagonally, as well as to turbines having either fixed or adjustable blades arranged either radially or diagonally upon the propeller or runner hub, whereby the illustration of turbine propellers and runners with radial blades herein is not to be regarded as restrictive to turbines with radial blades.

Figure 1:
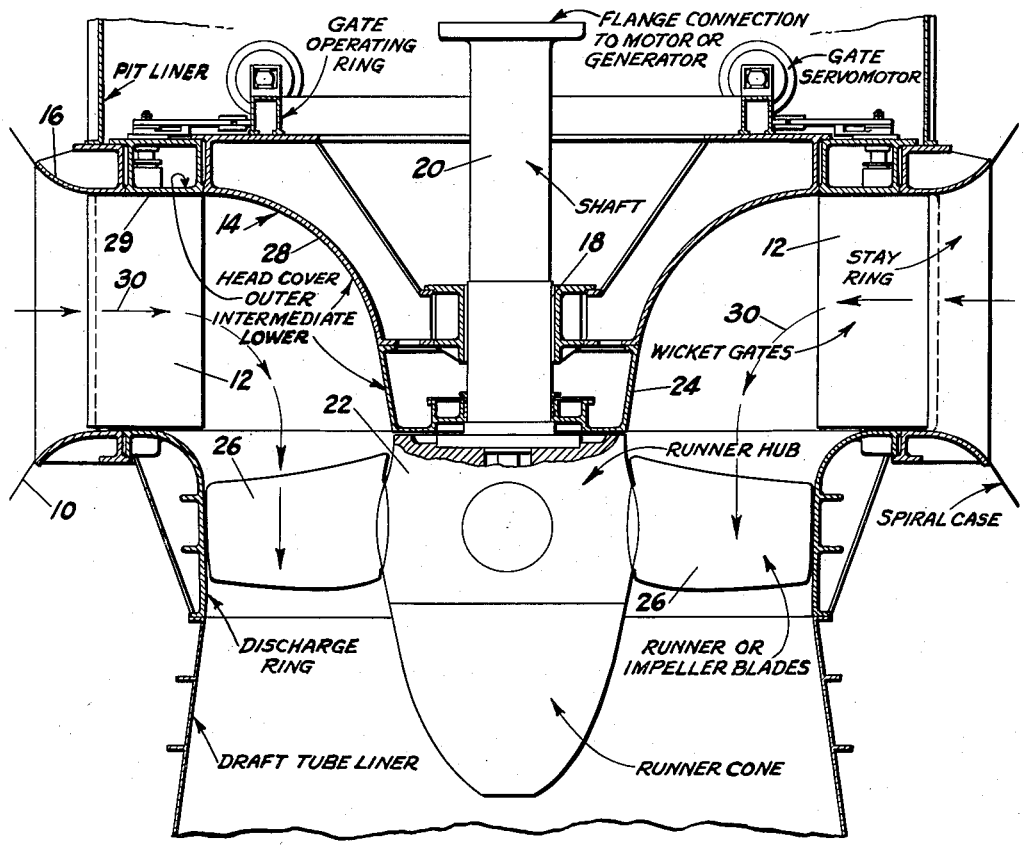
Fig. 1 is a fragmentary, vertical sectional view of an exemplary turbine unit of conventional construction wherein the head cover assembly is mounted stationarily and the turbine runner is rotatable relative thereto, it being understood that this view also will serve to illustrate the basic elements of a pump if the wicket gates are disregarded and the directional arrows are reversed.

In the conventional, and incidentally adjustable blade, type turbine shown in Fig. 1, the spiral case 10 receives water from the inlet source of the hydro-electric plant, said case supplying water to pass substantially radially between the wicket gates 12, the water contacting the head cover assembly 14 which is fixed relative to the stay ring 16. A fixed guide bearing 18 receives the lower end of the turbine shaft 20 to which the runner hub 22 is fixed. Said hub rotates relative to the fixed lower head cover 24 comprising a part of assembly 14 and the runner blades 26 project substantially radially from the hub 22 and are axially adjustable relative to said hub by conventional means, not shown.

As the water for driving the turbine runner moves radially against the head cover 14 and particularly the intermediate portion 28 thereof, the water will be deflected in an axial direction parallel to the shaft 20 so as to engage the runner blades 26. Such deflecting, or changing the direction of the water, produces substantial force upon the head cover 14, in a radial direction, which forces are offset against each other from opposite sides of the turbine. However, there also is a substantial vertical component of force produced by the incoming water, which force must be sustained by the fastenings of the head cover assembly 14 to the stay ring 16 through the medium of outer head cover 29 of said assembly.

The path of the water is generally indicated by arrows 30 shown in Fig. 1 and it will be seen that there is a vertically downward thrust upon the runner blades 26 in the direction of said arrows. Although the dead weight of the rotating parts of the turbine such as the runner, shafting, and other mechanisms connected to the shafting 20 above the portion thereof shown in Fig. 1, exerts a substantial downward thrust, which is sustained by a thrust bearing adjacent to the generator but is not shown in the present illustration, by far, the major vertical thrust sustained by said thrust bearing is produced by the force of the water against the runner blades 26. By way of more specific illustration, the weight of the rotating parts in a turbine of this type usually amounts to only approximately 20 to 25% of the total vertical downward thrust exerted upon the turbine runner, the remainder being hydraulic thrust. Hence, it will be obvious that any utilization of even a relatively small portion of this hydraulic thrust principally against the intermediate head cover 28 will comprise a tremendous advantage in relieving the thrust upon the thrust bearings of the turbine installation.

Regarding thrusts usually encountered in hydraulic turbines, for example such as used in hydro-electric power plants, the vertical thrust will vary materially between different types of runners. For example, when using a so-called Francis type turbine wherein buckets are employed for engagement by water admitted radially to the runner, and wherein the water engages the buckets substantially radially to rotate the runner, no appreciable amount of vertical thrust results from the engagement of the water with the buckets of the rotor. Also, thrust bearings used in turbines of the Francis type are regarded substantially as normal thrust bearings. Due however to the fact that either fixed or variable blade propellers or runners are engaged by water directed substantially axially to the propeller or runner toward the discharge thereof, additional vertical thrust of substantial proportions are included in the total thrust as a result of the added hydraulic thrust. Hence, in computing the costs of generator manufacture, additional costs are required where fixed or variable blade propellers or runners are used to operate the generators, as distinguished from Francis or other so-called bucket type turbines.

Regarding fixed or variable blade propellers or runners, the total vertical thrust developed thereby, including the hydraulic thrust, increases as the diameter of the propeller or runner increases and also as the head of the water used to drive the turbine increases. In turbines of the larger sizes driven by the higher heads, the matter of minimizing the total thrust is less important than in propellers and runners of medium sizes used with medium heads but only because these larger sizes of turbines usually require special designs of thrust bearings in any event, notwithstanding that the difficulties of design increase with bearing capacity. However, in propellers and runners of less than about 150 inches in diameter and using less than about 150 foot heads of water, for example, there is a possibility of using substantially standard thrust bearings if a reasonable reduction in the total axial thrust can be achieved. The present invention makes it possible to very substantially reduce said total axial thrust.

Rather than mount the head cover 14 of Fig. 1 stationarily, it is the principal object of the present invention to fix the head cover relative to the propeller or impeller, depending upon whether the hydraulic device is a turbine, pump, or pump-turbine. Two exemplary illustrations of different types of arrangements in accordance with the present invention are illustrated respectively in Figs. 2 and 3. For purposes of simplifying the illustration, only one-half of an exemplary illustration is shown, extending between the center line of the propeller or runner of a turbine and the periphery of the stay ring, a fragmentary portion of the spiral case also being shown in the left-hand portion of each of these figures.

Figure 2:
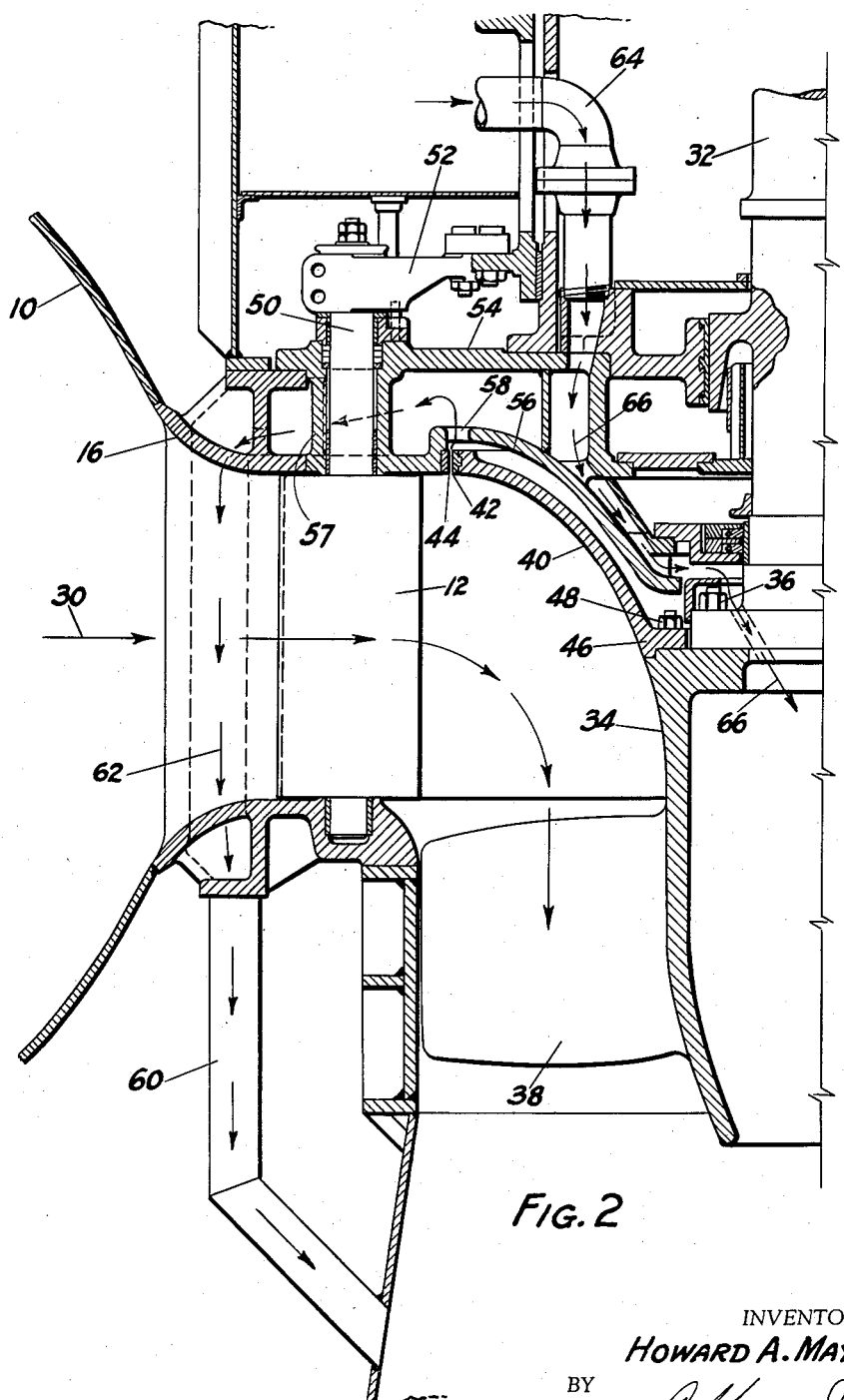
Fig. 2 is a fragmentary vertical sectional view between the center line and one side of a turbine having an exemplary fixed blade propeller and embodying the principles of the present invention.
Figure 3:
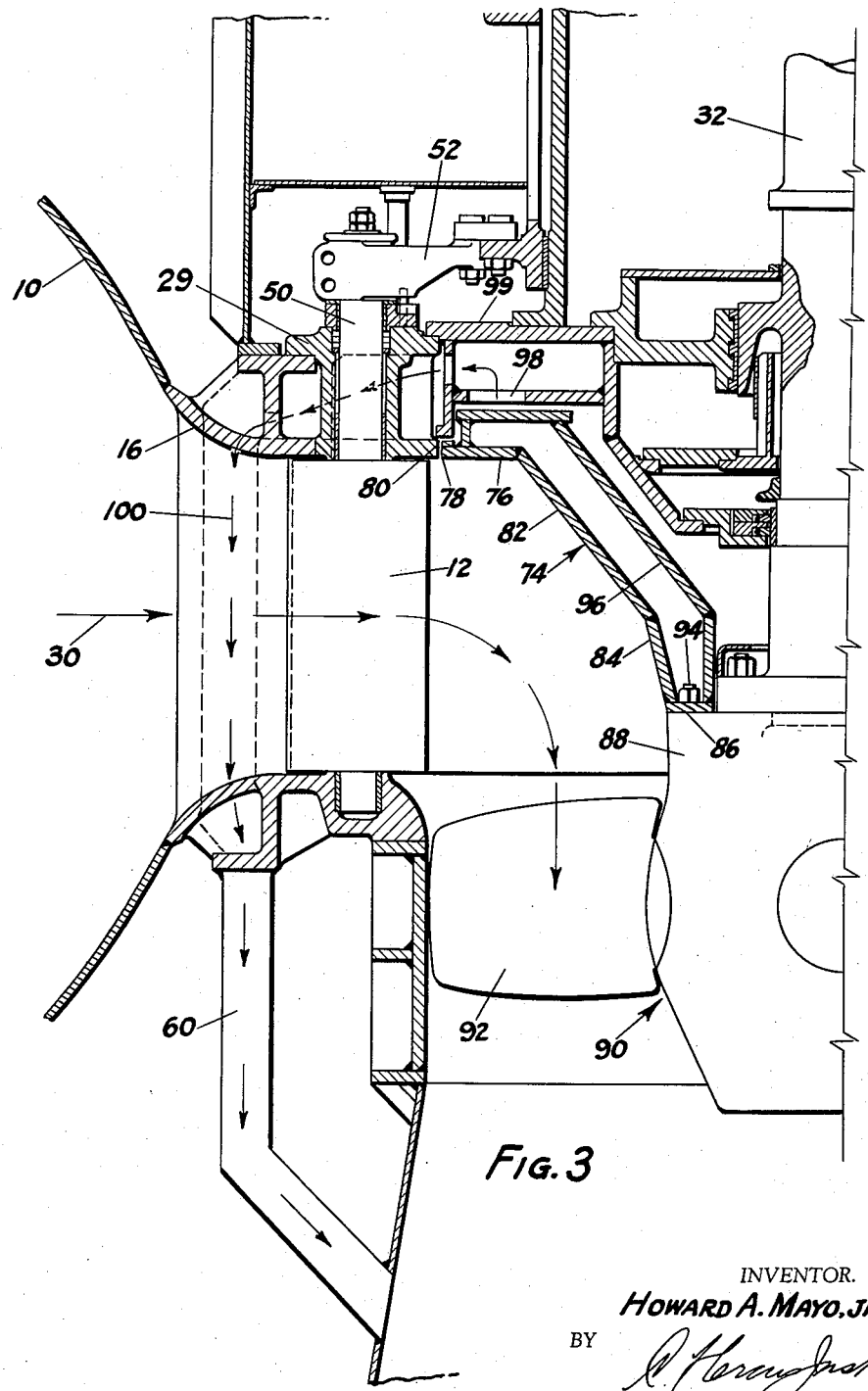
Fig. 3 is a view similar to Fig. 2 but illustrating an exemplary turbine having an adjustable blade runner or propeller and including a different embodiment of the invention.

Referring to Fig. 2 particularly, a fixed blade propeller has been illustrated. However, it is to be understood that the propeller or runner may be of the diagonal or radial blade types which are adjustable or variable relative to the hub as illustrated in Fig. 3 for example. In Fig. 2, the water inlet and flow control portion of the illustration are the same as those in Fig. 1 and similar reference characters have been applied. The rotatable elements however have been provided with different reference characters than those in Fig. 1.

In Fig. 2, the turbine shaft 32 is fixed at its lower end to a hub 34, by bolts 36 or the like. Vanes or blades 38 are fixed to the periphery of the hub 34 and project radially therefrom. Also integral with or fixed to the upper end of hub 34 is a water deflecting member 40 which is curved in two directions and extends upwardly and outwardly from the upper end of hub 34. In shape, this specific illustration of water deflecting member 40 somewhat resembles the head cover 14 shown in Fig. 1. To distinguish between the two however, member 40 in Fig. 2 is referred to as a water deflecting member. It will be understood that in cross-section transverse to the shaft 32, the deflecting member 40 is circular, whereas in vertical section as shown in Fig. 2, said member curves upwardly and outwardly, the upper periphery 42 thereof being spaced slightly from the inner periphery 44 of stationary head cover 54. It will be understood that the outer periphery 42 of deflecting member 40 will revolve relative to the inner periphery 44 of the stationary head cover 54 during the operation of the runner or turbine. The lower peripheral end 46 of deflecting member 40 is fixed to the upper end of hub 34 by any suitable means such as bolts 48 or it may be cast integrally with the said hub. Also, the deflecting member 40 has a relatively smooth curvature as is shown in Fig. 2, said deflecting member being formed from connected segmental sections, from castings.

The wicket gates 12 are operated by shafts 50 and crank arms 52 which are movable relative to head cover 54 which has supporting means that are stationary relative to head cover 54 and stay ring 16. Also connected to head cover 54 and its inner periphery 44 is a curved barrier member 56 having vent openings 58 at suitable locations, whereby any water leaking between the two relatively movable peripheral edges 42 and 44 may pass upwardly through the openings 58 and be discharged from between gate shaft columns through a drain tube 60 as indicated by the arrows 62. It will be appreciated that the water entering radially between the wicket gates 12 will usually be under substantial pressure and there will be a tendency for a small amount of the same to leak between the peripheral surfaces 42 and 44 as indicated above. However, the same is readily discharged from the interior of the turbine by means of one or more drain tubes 60. The opposing curved surfaces of deflecting member 40 and barrier member 56, which comprises part of head cover 54, produce a pump effect when moving relatively, thereby effecting a centrifugal seal which insures discharge of any water as described above.

Air inlet means 64 also are provided as shown in Fig. 2 for purposes of permitting the introduction of air as shown by arrows 66, to the interior of hub 34, thereby preventing a vacuum from occurring within the hub, especially where the same has an open lower end as shown in Fig. 2, as commonly employed in fixed blade propellers or runners, and impellers.

As in regard to the description of the results of the incoming water engaging the propeller or runner blades shown in Fig. 1, the water entering the turbine shown in Fig. 2, in the direction of the arrows 30, will result in a high hydraulic thrust being exerted downwardly against the blades 38 in a direction substantially parallel to the shaft 32. However, said water initially enters between the wicket gates in a radial direction substantially transverse to the axis of shaft 32, whereby forces such as illustrated diagrammatically in Fig. 4 will be exerted. Such illustration of forces is only intended to be illustrative, particularly to depict graphically the fact that there will be a substantial vertical component 68 resulting from the diagonal water velocity thrust 70.

There also will be a substantially horizontal component 72 but such components at diametrically opposite sides of the deflecting member 40 will cancel each other. However, the vertical component of thrust 68 will operate uniformly around the entire circumference of the deflecting member 40 to balance out to a substantial degree the downward hydraulic thrust of the water indicated by the arrows 30 in Fig. 2. Such vertical upward component of thrust 68 will be of such proportions as to greatly relieve the downward hydraulic thrust imposed upon the thrust bearings normally located above the turbine runner for example, these usually being mounted in conjunction with the generator which is driven by the turbine, neither the thrust bearing nor the generator being shown in the present drawings since the construction of both of these is well known to those skilled in the art.

By using deflecting means similar to the member 40 in Fig. 2, the resulting vertical components of the hydraulic thrust against the deflecting member 40 is particularly advantageous in turbines of medium size such as less than about 150 inches diameter and operating at heads as much as about 150 feet, so that so-called normal thrust bearings may be utilized to support the runner and rotating parts of the generator, rather than require special designs of thrust bearings which introduce a considerable addition in cost of the generator over situations where normal types of thrust bearings can be used and particularly those designed for use with Francis turbines having buckets as distinguished from vanes or blades and in which the buckets are engaged by the water in a direction transverse to the shaft of the runner as distinguished from substantially parallel thereto as in fixed or variable blade propeller type turbines.

Under conditions where the formation of the deflecting member 40 from a casting or castings may be difficult because of size, particularly in larger sizes of turbine runners, it would be more practical to fabricate such deflecting members from various shapes and sections of heavy gage metal plates or sheets, connecting the same by welding. An exemplary disclosure of such type of deflecting member is illustrated in Fig. 3. Further, in Fig. 3, the exemplary propeller or runner is shown as being of the variable or adjustable blade type. However, it is to be understood that such illustration is made primarily to show the versatility of application of the invention to different types of runners or propellers for turbines, or impellers for pumps.

Referring to Fig. 3 particularly, water passes from the spiral case 10 radially between the wicket gates 12 and engages the deflecting member 74. Deflecting member 74 is fabricated from a plurality of flat metal plate or sheet members of suitable thickness. For example, an annular horizontal member 76 has an outer periphery 78 which is movable relative to the inner peripheral edge 80 of stationary outer head cover 29, there being limited clearance between the two as in regard to the construction shown in Fig. 2. An intermediate frusto-conical or diagonal section 82 extends between the inner edge of annular member 76 and the upper edge of lower frusto-conical or sloping section 84, the edges of the various members or sections all being secured together by welding horizontally or vertically, some of which welding connections are clearly shown in Fig. 3. The lower edge of section 84 is secured to an annular horizontal flat ring 86 which abuts the upper end of hub 88 of the adjustable blade runner 90 and is rigidly attached thereto by bolting or the like.

In this construction, the hub 88 is closed at its lower end in that the hub will contain the operating mechanism for the adjustable runner blades 92. There will be a number of runner blades 92 projecting radially or diagonally from the hub 88 at circumferentially spaced positions, and the operating means for the blades 92 by which adjustment is effected is of conventional nature but is not illustrated herein. However, the operating mechanism must be sealed against the entrance of water or other extraneous material. Hence, it is not possible to vent the interior of hub 88 as in the construction shown in Fig. 2.

The deflecting member 74 is secured to hub 88 by suitable means such as bolts 94 which are circumferentially spaced and pass through holes in the flat ring 86 comprising an integral part of deflecting member 74. Further, the specifically illustrated sloping and other positions of the members 76, 82 and 84 of deflecting member 74 are merely illustrative and other angular relationships may be used in any specific design desired. Also, it will be understood that in sectional view transverse to the axis of shaft 32, all sections of the deflecting member 74 are circular about said axis. Further, to provide adequate strength and suitable bracing of the deflecting member 74, the assembly also may include a fabricated inner shell 96, the lower end of which is integral with the flat ring 86 and the shell 96 otherwise may be connected thereto by webs or the like. Inner shell 96 also preferably is formed, in any suitable manner, with access openings, provided with removable closures, through which the nuts on bolts 94 may be assembled and disassembled but such openings are not shown on the drawings. Any water leaking between the relatively movable peripheral edges 78 and 80 will move upwardly through vent openings 98 in stationary inner head cover 99 and pass from there in the direction of the arrows 100 into one or more drain tubes 60 as clearly shown in Fig. 3 as a result of the hydraulic pump action such as described relative to Fig. 2.

Figure 4:
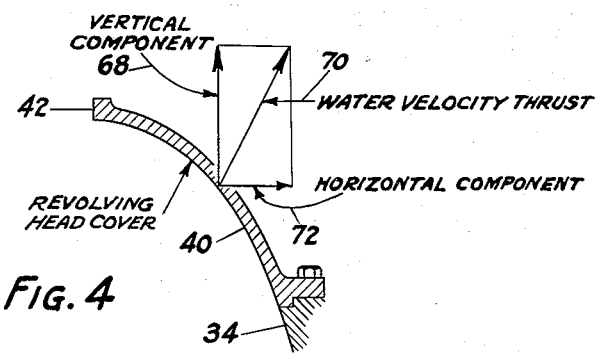
Fig. 4 is a fragmentary vertical elevation of an exemplary extension for a turbine runner or propeller and including a force diagram to illustrate certain principles of the invention.

Although the outer surface of the composite deflecting member 74 shown in Fig. 3 is not curved vertically as smoothly as the deflecting member 40 shown in Fig. 2, the deflecting member 74 nevertheless will result generally in the water velocity thrust 70, diagrammatically shown in Fig. 4, reacting against deflecting member 74 to produce an upward thrust 78 similar to that produced by the deflecting member 40 of Fig. 2. The slopes of the deflecting member will be selected to give the most effective results. Such vertical component will result in decreasing the downward vertical thrust caused by the hydraulic thrust against the runner blades 92 as well as other portions of the runner 90 and the weight of the rotating parts, with the resulting benefits described above regarding the embodiment shown in Fig. 2.

It will be understood that when the present invention is used in regard to impellers in pump structures, the direction of flow of the water will be reverse to that indicated by the arrows 30 in Figs. 2 and 3. Under such circumstances, the impeller of the pump, as represented in the instant drawings by turbine propellers or runners, will be driven so as to move water from a lower to a higher level. However, the deflecting members 40 and 74 respectively of Figs. 2 and 3, or variations thereof, will be similarly shaped and will function to produce hydraulic thrusts of the general type indicated by vector 70 in Fig. 4. One resultant component 68 of this will extend vertically to reduce the effect of the normal hydraulic thrust imposed upon the impeller blades, as well as the weight of the rotating parts of the impeller structure, upon the thrust bearing which supports the impeller.

The present invention also is of particular importance in combination pump-turbine units in which the pitch of the blades may be reversed from turbine to impeller use or vice versa, or the direction of rotation reversed, it being understood to those skilled in the art that structures of this type are economical to use in certain installations where off-peak power may be used to drive a pump, particularly to pump water to a higher level during such off-peak periods, and subsequently use the water, when desired, to drive the rotating member when arranged as a turbine runner to drive a generator for producing power during on-peak periods.

From the foregoing, it also will be seen that the invention is equally applicable to fixed or variable blade propellers or runners for turbines, or fixed or variable blade impellers for pumps, with equal advantage and facility, all resulting in a substantial reduction in the axially downward force imposed upon the thrust bearing supporting the turbine runner or pump impeller and other rotating parts, by the hydraulic thrust as well as the weight of the rotating parts of the turbine or pump unit. It thus is intended to encompass pump and pump-turbine units within the terms of the appended claims, as well as turbines. The water deflecting means fixed to the bladed rotor also affords increased inertia which aids in maintaining rotational stability of the rotary parts.

While the invention has been described and illustrated in its preferred embodiments, and has included certain details, it should be understood that the invention is not to be limited to the precise details herein illustrated and described since the same may be carried out in other ways falling within the scope of the invention as claimed.

I claim:
1. A hydraulic machine of the class comprising turbines, pumps and pump-turbines, said machine having circumferential water passage means operable to direct water substantially radially therethrough, and a propeller type water-engageable member rotatable about an axis perpendicular to the plane of the radial flow of water to or from said passage means and having a hub supporting a plurality of unshrouded propeller type blades connected to and extending substantially radially from said hub, said blades being free and unsupported at the outer ends thereof, in combination with water deflecting means fixed to and rotatable with said hub, said deflecting means having a substantially smoothly curved surface extending axially away and radially outwardly from said hub and substantially unobstructed by the ends of said blades attached to said hub, and said means extending toward said circumferential water passage means substantially independently of said blades and operable to deflect water between a radial direction through said passage means and an axial direction incident to engaging said blades, whereby the water pressure and velocity thrust acting radially against said deflecting means produces a thrust component directed axially away from the outer end of said hub and substantially counteracts the hydraulic axial thrust against said blades.

2. A hydraulic machine of the class comprising turbines, pumps and pump-turbines, said machine having circumferential water passage means operable to direct water substantially radially therethrough and a propeller type water-engageable member rotatable about an axis perpendicular to the plane of the radial flow of water to or from said passage means and having a hub supporting a plurality of unshrouded propeller type blades connected to and extending substantially radially from said hub, said blades being free and unsupported at the outer ends thereof, in combination with water deflecting means fixed to said hub, said deflecting means having a substantially smoothly curved surface extending axially away and radially outwardly from said hub and substantially unobstructed by the ends of said blades attached to said hub, and said deflecting means extending toward said circumferential water passage means substantially independently of said blades and the outer surfaces of said deflecting means and hub being substantially continuous relative to each other and operable to deflect water between a radial direction through said passage means and an axial direction incident to engaging said blades, whereby the water pressure and velocity thrust acting radially against said deflecting means produces a thrust component directed axially away from the outer end of said hub and substantially counteracts the hydraulic axial thrust against said blades.

3. A hydraulic machine of the class comprising turbines, pumps and pump-turbines, said machine having circumferential water passage means operable to direct water substantially radially therethrough, and a propeller type water-engageable member rotatable about an axis perpendicular to the plane of the radial flow of water to or from said passage means and having a hub supporting a plurality of unshrouded propeller type blades connected to and extending substantially radially from said hub, said blades being free and unsupported at the outer ends thereof, in combination with water deflecting means fixed to and rotatable with said hub, said deflecting means having a substantially smoothly curved surface substantially unobstructed by the ends of said blades attached to said hub, said deflecting means extending axially away from said hub toward said circumferential water passage means and outwardly radially substantially coextensively with the tips of said blades and independent of said blades, thereby being operable to deflect water between a radial direction through said passage means and an axial direction incident to engaging said blades and affording increased inertia to aid in maintaining rotational stability, whereby the water pressure and velocity thrust acting radially against said deflecting means produces a through component directed axially away from the outer end of said hub and substantially counteracts the hydraulic axial thrust against said blades.

4. A hydraulic machine of the class comprising turbines, pumps and pump-turbines, said machine having circumferential water passage means operable to direct water substantially radially therethrough, and a propeller type water-engageable member rotatable about an axis perpendicular to the plane of the radial flow of water to or from said passage means and having a hub supporting a plurality of unshrouded propeller type blades connected to and extending substantially radially from said hub, said blades being free and unsupported at the outer ends thereof, in combination with water deflecting means fixed to and rotatable with said hub of said water-engageable member, said deflecting means being substantially circular in cross-section transverse to the axis of said water-engageable member and having a substantially smoothly curved surface substantially unobstructed by the ends of said blades attached to said hub, said deflecting means extending axially away and radially outwardly from said hub toward said water passage means and independent of said blades and operable to deflect water between a radial direction through said passage means and an axial direction incident to engaging said blades, whereby the water pressure and velocity thrust radially against said deflecting means produces a thrust component directed axially away from the outer end of said hub and substantially counteracts the hydraulic axial thrust against said blades.

5. A hydraulic machine of the class comprising turbines, pumps and pump-turbines, said machine having circumferential water passage means operable to direct water substantially radially therethrough, and a propeller type water-engageable member rotatable about an axis perpendicular to the plane of the radial flow of water to or from said passage means and having a hub supporting a plurality of unshrouded propeller type blades connected to and extending substantially radially from said hub, said blades being free and unsupported at the outer ends thereof, in combination with water deflecting means fixed to and rotatable with said hub of said water-engageable member, said deflecting means comprising frusto-conical sections respectively of different degrees of slope and circular in cross-section connected in end-to-end relationship and comprising a deflecting unit having a substantially smoothly curved surface extending axially away and radially outwardly from said hub toward said water passage means and substantially unobstructed by the ends of said blades attached to said hub, said deflecting means being operable to deflect water between a radial direction through said passage means and an axial direction incident to engaging said blades, whereby the water pressure and velocity thrust radially against said deflecting means produces a thrust component directed axially away from the outer end of said hub and substantially counteracts the hydraulic axial thrust against said blades.

References Cited in the file of this patent

UNITED STATES PATENTS

| | | |
|---|---|---|
| 1,137,948 | Buehle | May 4, 1915 |
| 1,693,600 | Grant | Dec. 4, 1928 |
| 2,077,883 | Hand | Apr. 20, 1937 |
| 2,529,880 | McClure | Nov. 14, 1950 |
| 2,783,392 | Corbiere | Feb. 26, 1957 |
| 2,818,227 | Suss | Dec. 31, 1957 |
| 8,875,979 | Danel et al. | Mar. 3, 1959 |

FOREIGN PATENTS

| | | |
|---|---|---|
| 64,788 | France | June 29, 1955 |
| 492,697 | Italy | Mar. 29, 1954 |